W. McCLAVE.
STOKER.
APPLICATION FILED SEPT. 30, 1909.
984,100.
Patented Feb. 14, 1911.
6 SHEETS—SHEET 6.
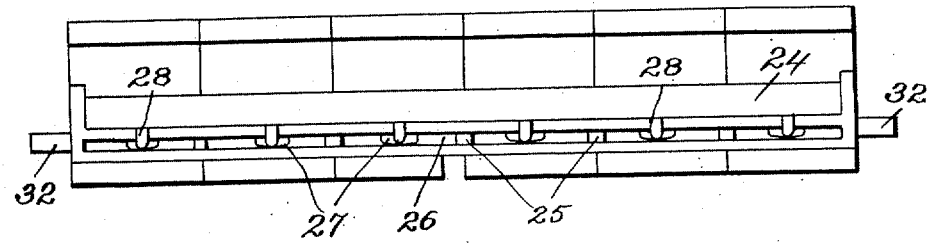
Fig. 12.
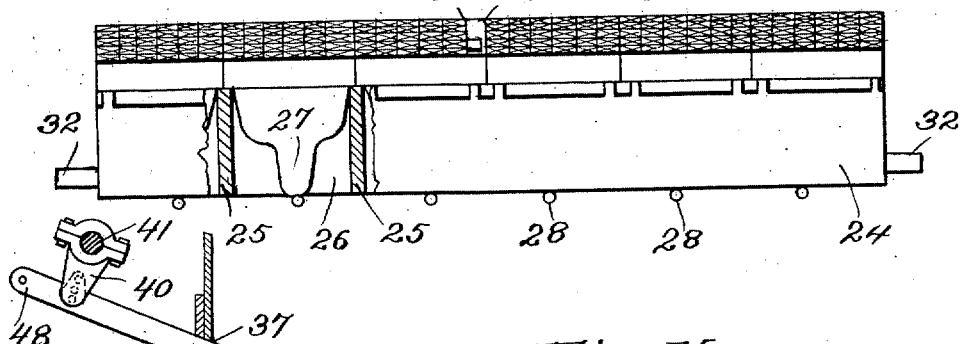
Fig. 13.
Fig. 15.
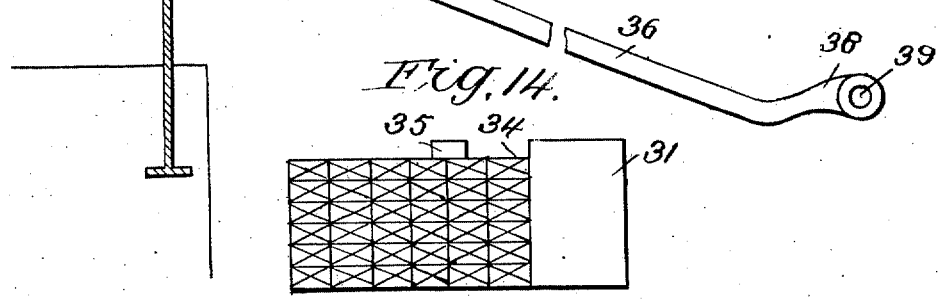
Fig. 14.
Witnesses
J M Fowler Jr
E. Cloud Newman
Inventor
William McClave,
By Mason Fenwick Lawrence,
Attorneys

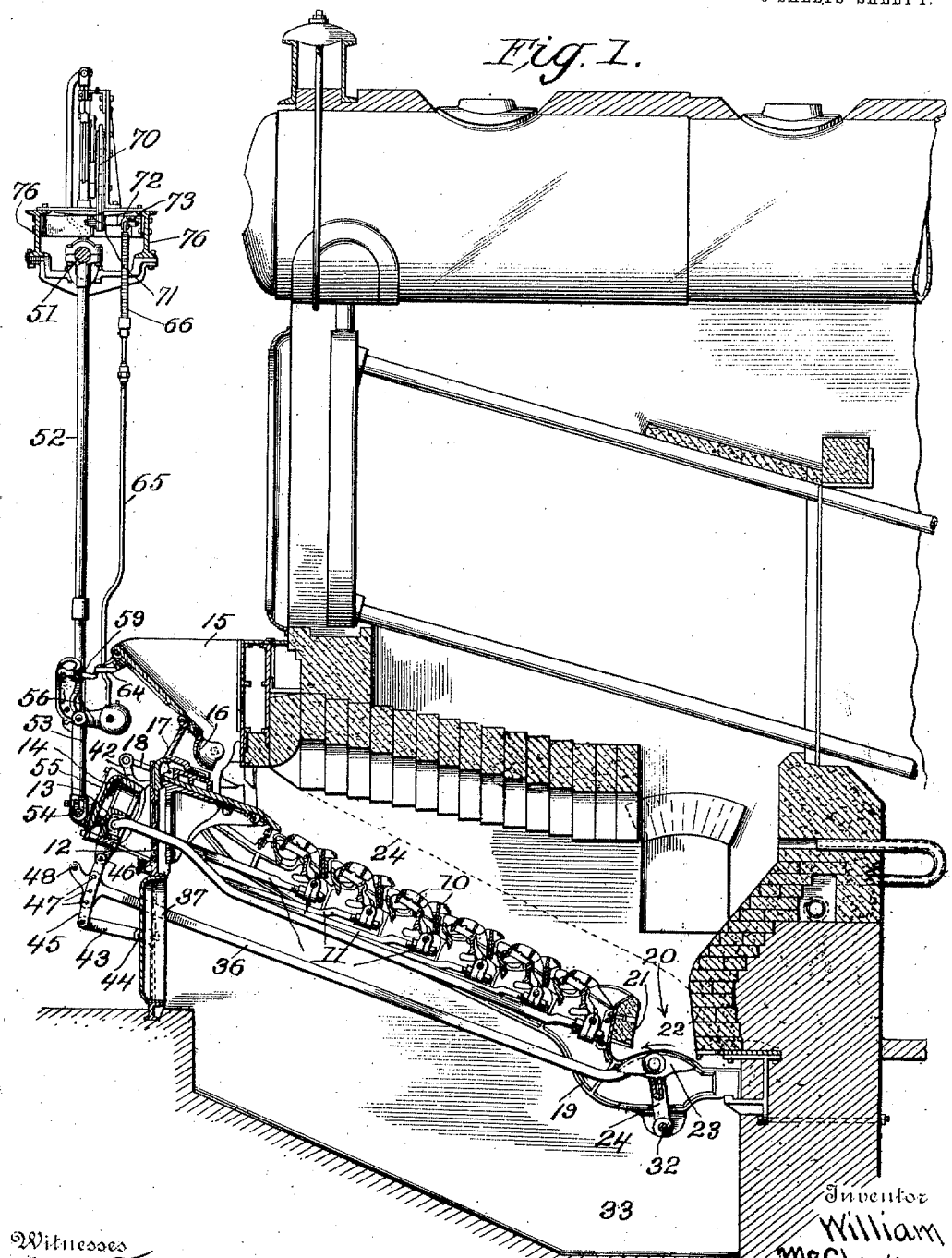

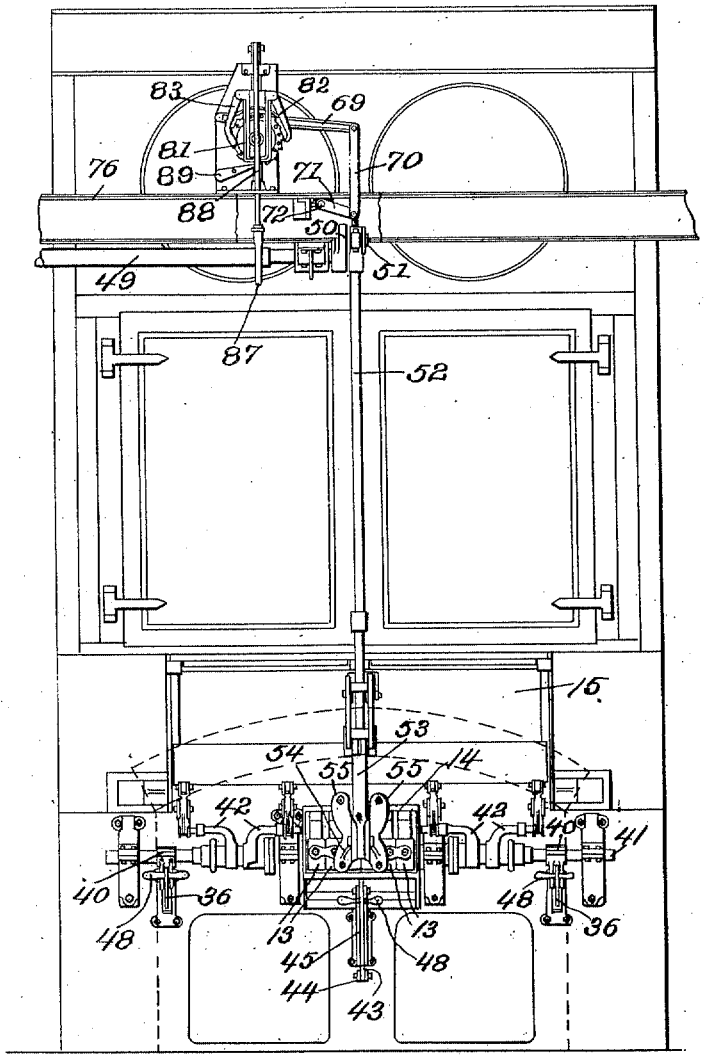

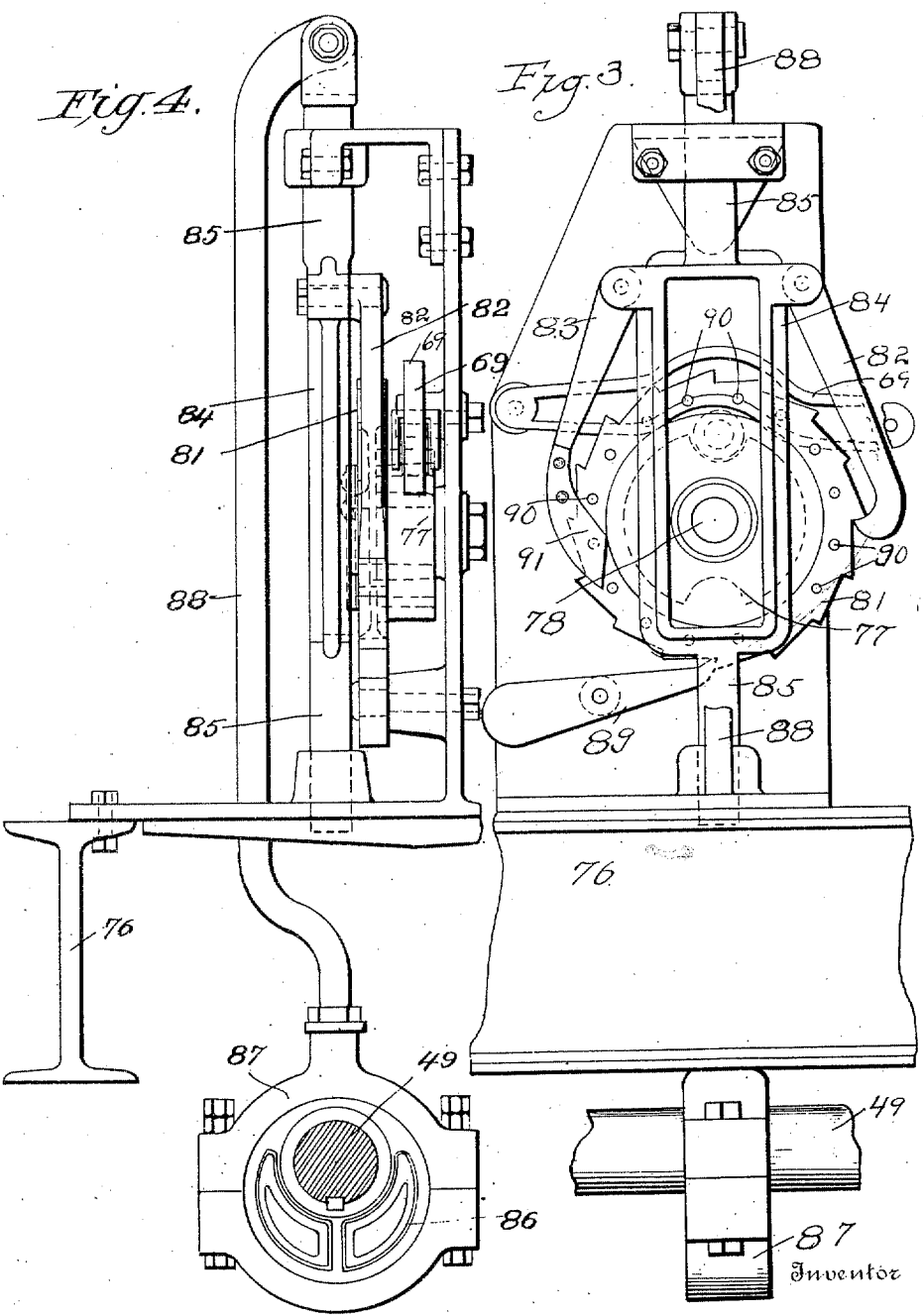

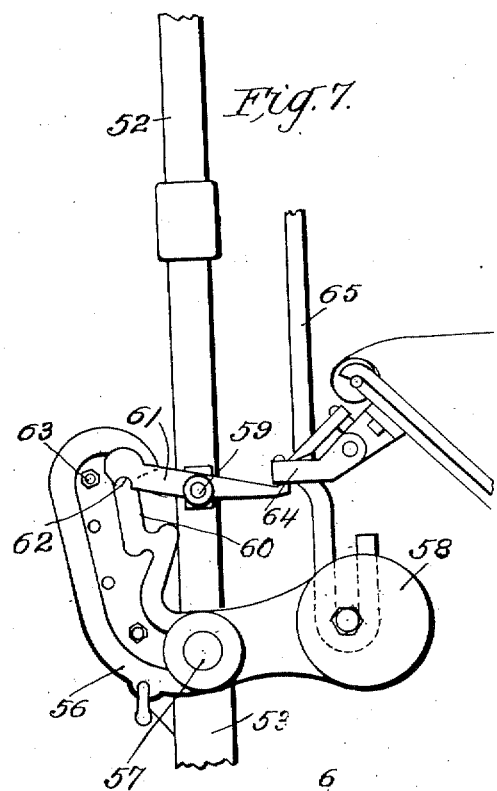
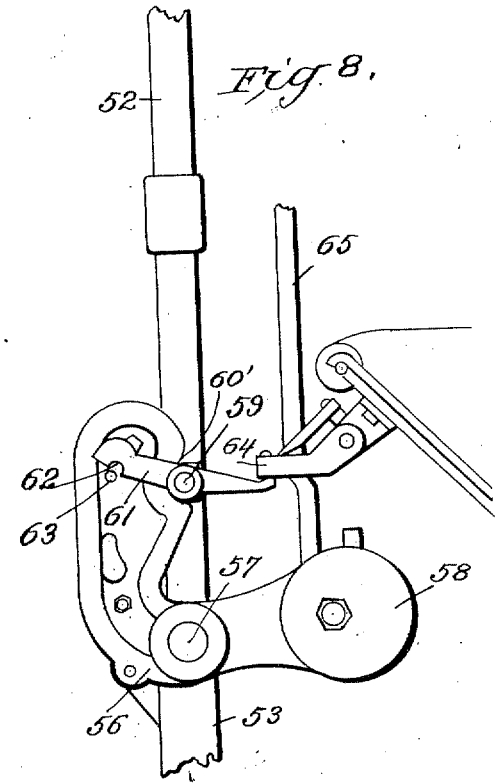
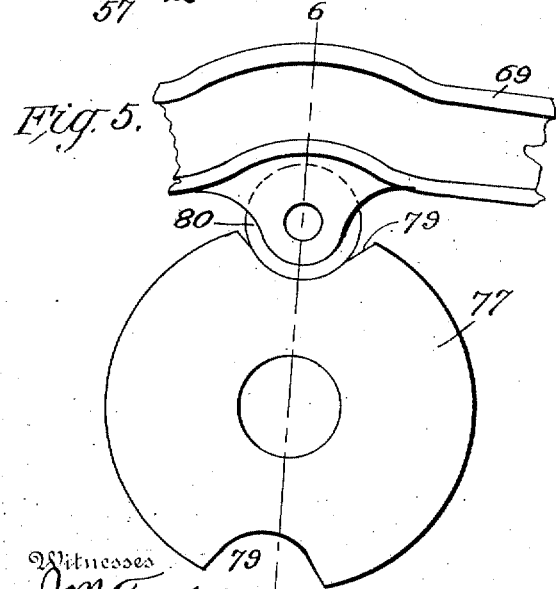
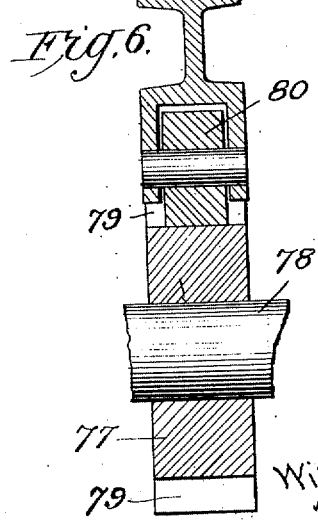

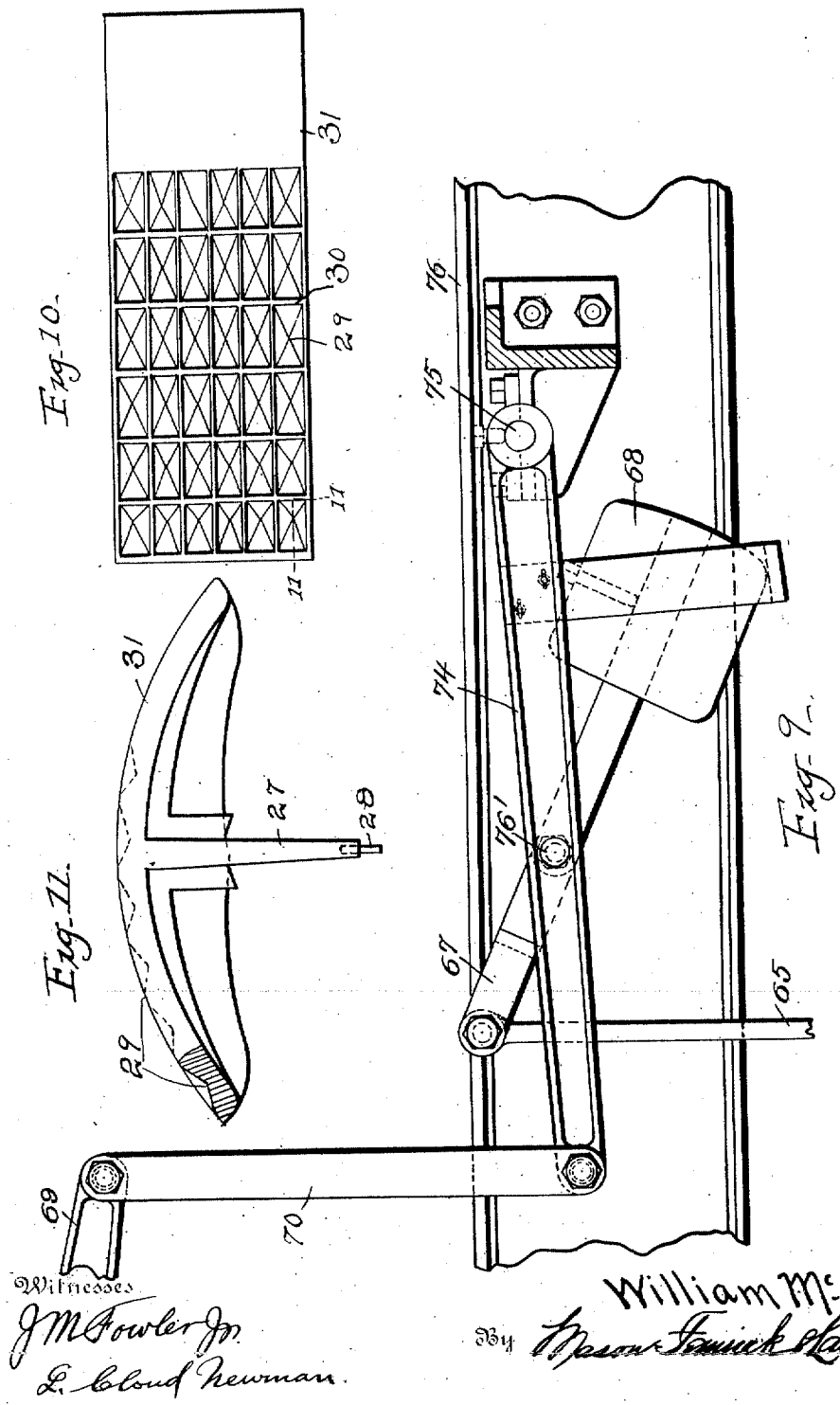

UNITED STATES PATENT OFFICE.

WILLIAM McCLAVE, OF SCRANTON, PENNSYLVANIA, ASSIGNOR TO McCLAVE-BROOKS COMPANY, OF SCRANTON, PENNSYLVANIA, A CORPORATION OF PENNSYLVANIA.

STOKER.

984,100. Specification of Letters Patent. Patented Feb. 14, 1911.

Application filed September 30, 1909. Serial No. 520,296.

*To all whom it may concern:*

Be it known that I, WILLIAM McCLAVE, a citizen of the United States, residing at Scranton, in the county of Lackawanna and State of Pennsylvania, have invented certain new and useful Improvements in Stokers; and I do hereby declare the following to be a full, clear, and exact description of the invention, such as will enable others skilled in the art to which it appertains to make and use the same.

This invention relates to stokers, and has for an object to provide a stoker embodying an inclined fuel supporting surface composed of rocking grate bars with means for introducing fuel at the upper end of the fuel supporting surface and with improved means for rocking the grate bars intermittently.

A further object of the invention is to provide in an intermittent rocking mechanism for stoker grates means for varying the throw of the grates in different parts of the fuel supporting surface.

A further object of the invention is to provide a pocket at the lower end of the fuel supporting surface into which the residue is dumped, such pocket being provided with inclined sides diverging downwardly and with means at the bottom of the pocket for intermittently discharging the refuse from the pocket.

A further object of the invention is to provide at the bottom of the refuse pocket a rocking plate provided with means for discharging the refuse from the pocket without uncovering the lower opening of the pocket which is closed by such rocking plate.

A further object of the invention is to provide means for intermittently rocking the refuse discharge coincidentally with the rocking of the grate bars.

A further object of the invention is to provide improved means employing a constantly rotating shaft for actuating the several parts of the stoker with improved means for connecting and disconnecting the parts from such rocking shaft to provide an intermittent actuation.

A further object of the invention is to provide improved means for connecting and disconnecting the intermittent mechanism with and from the actuated parts.

With these and other objects in view, the invention comprises certain novel constructions, combinations and arrangements of parts as will be hereinafter fully described and claimed.

In the drawings:—Figure 1 is a vertical longitudinal sectional view through the improved stoker showing the grate bars, arch and furnace structure in section and the intermittently operating mechanism in side elevation. Fig. 2 is a view of the improved rocking mechanism shown in association with a furnace seen in front elevation. Fig. 3 is a view in front elevation of the ratchet motion converter. Fig. 4 is a view in side elevation of the ratchet mechanism seen at Fig. 3. Fig. 5 is a fragmentary detail view of the cam which is associated with the ratchet motion converter seen at Figs. 3 and 4. Fig. 6 is a diametrical sectional view through the cam and associated parts as seen on line 6—6 of Fig. 5. Fig. 7 is a view in side elevation of the lock for connecting the constantly reciprocating plunger with the intermittently reciprocating plunger. Fig. 8 is a view in side elevation of a slight modification of the lock shown at Fig. 7. Fig. 9 is a view in front elevation of a modified means connecting the ratchet converter with the lock shown at Figs. 7 and 8. Fig. 10 is a top plan view of one embodiment of one of the refuse discharge sections. Fig. 11 is a view in side elevation of the refuse discharge section shown at Fig. 10 with one corner broken away on line 11—11 to show the formation of the pockets. Fig. 12 is an inverted perspective view of the bar carrying the refuse dump sections. Fig. 13 is a view in side elevation of the bar carrying the refuse dump sections with one side broken away to show the position of the sections relative to the bar. Fig. 14 is a top plan view of one of the ash dump sections employed at the middle of the bar and used to connect the controlling link therewith. Fig. 15 is a view in side elevation of the controlling link connected to the middle dump section shown at Fig. 14.

Like characters of reference designate corresponding parts throughout the several views.

In the present invention the fuel supporting surface may be of any approved type of rocking grate bars but preferably the grate bars similar in all respects to the grate bars shown in Patent No. 849913 issued April 9, 1907, are employed, wherein alternate bars are stationary and other alternate bars are rocking bars. As in the disclosure of the said patent the bars are also provided with links 11 which extend outwardly through the front of the furnace structure as at 12 and are connected with blocks 13 slidably mounted in the rocking frame 14, the same as in the aforesaid patent. Also as in the said Patent No. 849913 a hopper 15 is provided with a regulating curved plate 16 and a pusher 17 operated by link 18 from the frame 14. Also as in the said patent when a fuel surface exceeding in width the length of one grate bar is to be employed the grate bars are connected as disclosed in the said patent by connecting similar grate bars end to end so that all of the grate bars forming the fuel surface are rocked by the links 11 connected to the central series of bars. While it is illustrated herein as disclosed in the said patent and found a satisfactory and desirable form of fuel supporting surface and means for rocking the same it is to be understood that this application is not confined to such formation of grate bars or fuel surface and that any approved form of fuel surface operated from any form of rocking means may be substituted.

The beams 19 which form the support of the rocking grates are curved downwardly at their lower ends and at the lower end of the fuel supporting surface a well or pocket 20 is provided composed of the walls 21 and 22, the latter of which is preferably the wall of the combustion chamber and the former of refractory material supported by the beams 19. Also as shown at Fig. 1 the well or pocket 20 is formed with the sides 21 and 22 diverging downwardly so that the well is wider at the bottom than at the top to prevent the clogging or lodging of cinders or like material pushed from the fuel surface into the well or pocket. At the bottom of the well or pocket 20 a rocking closure indicated as a whole in Fig. 1 as 23 is employed so that material passing downwardly along the fuel supporting surface will conform at the top substantially to the dotted line 24 and the material as it is pushed over the lower end of such fuel supporting surface into the pocket 20 will continue to occupy substantially the same line of incline. The object of providing the well or pocket as shown is that even after passing the entire length of the fuel supporting surface some of the fuel is not consumed and when being supported within the pocket 20 air is admitted between the closure 23 and the edges of the walls 21 and 22 to complete the combustion of such unconsumed fuel.

The closure shown as a whole at 23 is made up of supporting bar sections shown at 24 in Figs. 12 and 13 having double walls with partitions 25 formed therein producing sockets 26 into which the webs 27 of the dump sections are inserted such a web being shown in detail at Fig. 11 the sections being provided with malleable studs 28 capable of being bent after being inserted in the sockets as indicated at Figs. 12 and 13 to retain the sections in the bars 24 until they are worn or broken and it is desirable to remove them. One configuration of the upper surface of the section is shown at Fig. 10 wherein something more than half of the surface is provided with recesses 29 having converging inclined sides, such recesses being separated by ridges or crests 30. The portion of the surface which is thus provided with the recesses 29 is that portion located under the wall 21 of the pocket. It will be noted from Fig. 1 that the lower edge or corner of the wall 21 is spaced at a greater distance from the top of the section than is the lower edge or corner of the wall 22. Under the lower edge or corner of the wall 22 the plain portion 31 of the sections is disposed. In discharging material the closure is rocked upon the trunnions 32 but a little distance not enough to uncover any portion of the lower opening of the pocket 20, it being noted that the closures are of a dimension greater than the transverse area of such pockets and that a rocking motion is provided for without uncovering the lower side of the pocket. The recesses 29 engage the ash and cinders contained in the pocket 20 and as the closure 23 rocks downwardly in the direction indicated by the arrow ash and ground ciders are carried by such closure under the corner of the wall 21 and discharged into the ash pit 33 under the fuel surface. As shown at Figs. 1, 10 and 11 it is not intended to discharge ash or refuse from the rear wall of the pocket 20 beneath the edge of the wall 22 but it is to be understood, of course, that the present invention is not limited to forming the pocket and closure so as to discharge upon one side only but comprehends discharging upon both sides. It will be apparent that even with the parts disposed and proportioned as shown at Fig. 1 some ash will be discharged under the wall 22 and it is within the scope of the present invention to increase the interval between the lower edge of the wall 22 and the closure 23 and also to increase the area of roughened surface upon the closure so that ash and ground cinders may be discharged upon both sides.

To provide for rocking the closure 23, one of the sections as shown at Fig. 14 is provided with a cut-out portion 34 such cut-out portion also being shown at Fig. 13 and a stud 35 is formed integral with the modified section shown at Fig. 14 which section is preferably disposed so that the cut-out portion is central of the bar as shown at Fig. 13. A rod 36 extends through the front wall of the stoker at 37 and is provided at its lower or inner end with a curved extremity 38, the curvature of which corresponds substantially to the curvature of one-half of one of the sections of the closure 23 and provided with a hole 39 adapted to pivot upon the stud 35. From an examination of Figs. 14, 15 and 1, it will be apparent that the curved extremity 38 with the hole 39 engaging upon the stud 35 will produce with such curved end substantially a filler for the cut-out portion 34 so that the upper curved surface of the closure 33 is practically unbroken when in normal position.

A bar 36 is provided for each of the closure bars 24 and except at the center are reciprocated by means of cranks 40 carried upon shaft 41 which forms the rocking center of the frame 14. Such bar also carries cranks 42 pivoted to the links 18 to actuate the pusher 17. At the center, however, as seen at Fig. 1 it is necessary on account of the frame 14 that the bar 36 be disposed considerably below the shaft 41 and a crank arm of the length required to connect such shaft with the rod 36 would give too great a throw to the rod and to the closure 23 connected therewith. To compensate a link 43 is pivoted to an ear 44 at the front of the furnace structure and a lever 45 pivoted to the link. The lever 45 is also pivoted as at 46 to the rocking frame 14 and the rod 36 is pivoted to such lever 45 at either of the holes 47. By employing this mechanism the central bar 36 is rocked in unison and similar amplitude with the side bars 36. All of the bars 36, both the central and side bars, are provided with handles 48 for the purpose of manually rocking the closure 23 when desired by removing the pivot pins from the rods 36.

It has been found from experiment that in mechanical stokers and especially in rocking grate stokers the grate bars burn out much more quickly than similar bars used in fuel supporting furnaces not mechanically rocked. Experiment has also shown that the cause for burning out more rapidly is the continued rocking of the bars whereby a compression and consequent raising of heat of the fuel is accomplished and also by the continued agitation of the under surface of the fuel more heat directly upon the bars results. To obviate this unnecessary and irritating burning out of stoker bars, it is found that if the bars are rocked intermittently and are permitted to rest between such intermittent movements, the bars and the fuel adjacent the bars is permitted to cool to a certain extent whereby the life of the bars is greatly increased. It is found desirable, however, at the moment of rocking the bars to give them a quick motion rather than a slow motion. For this purpose it is found necessary to have certain driving parts driven at sufficient speed to give to the bars the necessary speed of motion, but to connect such driving means with the bar actuating means only at intervals. For this purpose a constantly driven shaft 49 somewhat in the nature of a line shaft is run along in front of the several furnaces and stokers forming the battery. At each of the furnaces a crank 50 is provided having a wrist pin 51 journaled in the bearing end of a plunger 52 so that as the shaft 49 is continuously rotated the plunger 52 is continuously reciprocated. At its lower end the plunger 52 telescopes within a sleeve 53 which forms in reality one section of the plunger and which is pivoted as at 54 to brackets 55 rigid with the frame 14. Normally the plunger 52 reciprocates freely within the sleeve 53 without transmitting any motion thereto but at such times as it is desirable to transmit motion to the rocking parts a lock is brought into use consisting substantially of a bell-crank lever 56, pivoted to the sleeve 53 as at 57 shown at Figs. 7 and 8 and having one end weighted as at 58 seen in the same figures. The plunger 52 is provided with a rigid pintle 59 and the upper part of the bell-crank lever 56 is provided with a notch or recess shown at Fig. 7 as 60 and at Fig. 8 as 60' adapted to partially embrace the pintle 59. Fulcrumed upon the pintle 59 is a detent 61 provided with a notch 62 adapted to engage upon a pin 63 carried by the bell-crank lever and to maintain such bell crank lever with its aperture 60 or 60' in association with the pintle 59 whereby the sleeve 53 is locked to the reciprocating plunger 52 and to move therewith, rocking the frame 14 and the stoker mechanism associated therewith.

As it is desirable to give the rocking frame 14 and its connected parts but a single rocking movement a finger 64 is carried by the hopper 15 in position to engage the tail of the detent 61 upon the completion of its upward stroke and to detach it from the pintle 63. At the same time the weighted end of the lever 56 is raised by the link 65 actuated either by the spring 66 seen at Fig. 1 or the weighted lever 67 seen at Fig. 9, the weight 68 carried by such weighted lever 67 being sufficient to overbalance the weight 58 upon the bell crank lever 56.

For permitting the bell crank lever 56 to engage the pintle 59 the link 64 is connected with an arm 69, such connection being accomplished where the spring 66 is employed by means of a link 70 having one end pivoted to an arm 71 carried by a rock shaft 72 while a similar arm 73 is pivotally connected with the spring 66. In the form shown at Fig. 9 the link 70 is pivotally connected with a lever 74 pivoted as at 75 to the supporting frame 76 and also pivoted as at 76' to the weighted lever 67.

To raise and lower the extremity of the lever 69 whereby the link 65 is permitted to drop to permit the weight 58 to connect the bell crank lever 56 with the pintle 59 a cam 77 is mounted upon a shaft 78 transverse to the shaft 49 and provided with one or more recesses 79 proportioned to permit a roller 80 carried by the lever 69 to drop therein. It will be apparent, therefore, that as the cam 77 rotates the lever 69 is permitted to intermittently drop to drop the weight 58 and connect and lock together the sections of the plunger as above described.

To rotate the cam 77 a ratchet wheel 81 is mounted rigidly upon the shaft 78 and is engaged upon opposite sides by pawls 82 and 83. The pawls 82 and 83 are carried by a yoke 84 mounted to reciprocate vertically upon trunnions 85 such reciprocating motion being provided by means of an eccentric 86 carried upon the shaft 49 and embraced by a strap 87 and connected with the frame 84 through the pitman rod 88. A pawl 89 of substantially the usual type is employed to prevent backward motion of the ratchet 81 under the action of the vertically reciprocating pawls 82 and 83. In the ratchet wheel 81 adjacent its periphery a plurality of holes 90 are provided into which or any of which pins may be inserted which will engage a guard 91 carried by one of the pawls as 83 so that when one of the pins in such holes 90 engage such guard the pawl misses connection with one of the ratchet teeth. By inserting or removing pins from the hole 90 the speed at which the ratchet wheel 81 and consequently the cam 77 rotates may be varied. The normal rotation of such cam and ratchet wheel under the action of the reciprocating pawls is at the highest speed required and the speed of rotation will be decreased by inserting one or more pins in the holes 90. It will thus be apparent that with the shaft 49 constantly rotated and the plunger 52 constantly reciprocated the sleeve 53 will be reciprocated only when after repeated step by step movements of the ratchet wheel 81 the cam 77 is moved to such position that the roller 80 drops into the recesses 79 which permits the link 65 to drop and the lock to lock together the sections 52 and 53. This locking together of the sections produces a single reciprocation of the sleeve 53 and the parts connected therewith but upon coming to the upper extreme of its movement the finger 64 engages the detent 61 and unlocks the detent 61 from the pintle 63. During the single reciprocation of the plunger 52 the ratchet wheel 81 has been rotated a step which has again raised the lever 69. The raising of the lever 69 is permitted by reason of the spring 66 as shown at Fig. 1 or the weighted lever 67 as shown at Fig. 9 but immediately upon the unlocking of the sections 52 and 53 the weight or spring raises the weight 58 so that the parts 52 and 53 are not again locked together until by the continued step by step movement of the cam 77 the lever 69 is permitted to again drop.

By an inspection of the mechanism shown it will be apparent that the cam 77 is continually rotated with a step by step movement from the constantly rotating shaft 49 but that the step by step movement may be varied by the insertion or withdrawal of pins from the holes 90. When the cam 77 by such step by step movement brings one of the recesses 79 into position to receive the roller 80 the lever 69 again drops and motion is transmitted at the speed of the constantly rotated shaft 49 to rock the various parts connected with the sleeve 53. By this means the grate bars and also the closure 23 will give intermittent rocking motions, between which intermittent motions the parts remain stationary and are permitted to cool to such an extent that the grate bars do not burn out more rapidly in a mechanical stoker so intermittently operated than in other furnace structures employing similar grate bars. Also the intermittent rocking of the closure 23 is sufficient to discharge the ash from the pocket 20 and also to grind and discharge the clinkers, but to retain the refuse within such pocket 20 until any unconsumed fuel which passes from the grate surface has been finally consumed.

As above described the throw of the closure 23 may be varied so that if it is found the refuse consisting of ash, clinkers, etc. is not being discharged sufficiently fast to maintain the level of the refuse within the pocket at substantially the level of the fuel upon the surface the throw may be increased and it may also be decreased if it is found that the refuse is being discharged too rapidly to depress the level of the refuse in the pocket below the fuel surface, it being found desirable to maintain the level of the refuse substantially the same as the level of the fuel surface. It is also desirable to give the grate bars at different parts of the fuel surface throws of varying amplitude and this is accomplished as in patent No. 849913 by moving the blocks 13 nearer or farther from the pivot of the frame 14. As shown at Fig. 1 the pivots of the links 11 to the blocks 13 coincide with the pivot of the frame 14 so that no throw is given to the grate bars in that position. As the blocks 13 are moved upwardly within the frame 14, however, the throw of the grate bars is increased and as each of the grate bars is connected with a separate block separately adjustable in the frame 14 each may be given a throw of different amplitude as described in said patent.

It will be apparent that as the rocking grates and rocking ash discharge are being operated only a fraction of the time that power for rocking such parts is used for one stoker only during such rocking movement and that by properly connecting a plurality of stokers in a single battery and to a single shaft 49 they may be so timed that they will work serially, that is to say, that after the completion of operation of one stoker the operation of a second stoker will be begun and so on until all of the time between reciprocations has been used up when the first stoker will again be operated.

What I claim is:—

1. In a furnace, the combination with a fire supporting surface and a bridge wall, of a wall positioned at the inner end of said fire supporting surface defining, together with said bridge wall, an ash receiving pocket, a closure and ash discharge member for the lower end of said pocket formed so as to discharge ashes deposited thereon whenever rocked, and means for rocking said closure.

2. In a furnace, the combination with an inclined fire supporting surface and a bridge wall, of a wall arranged at the lower end of said inclined fire supporting surface defining, together with said bridge wall, an ash receiving pocket, a rocking closure arranged at the bottom of said pocket and so formed as to remove ashes from said pocket when the closure is rocked, said closure being proportioned to extend entirely across the bottom of said pocket, but with one side spaced therefrom, whereby the ashes in said pocket may be supported at all times and discharged when said closure is rocked, and means for rocking said closure for causing a discharge of ashes from said pocket.

3. In a furnace, the combination with an inclined fire supporting surface and a bridge wall, of a wall arranged at the lower end of said inclined fire supporting surface defining, together with said bridge wall, a pocket formed with downwardly converging sides extending substantially the entire length of said side walls, said pocket being adapted to receive ashes from said fire supporting surface, a rocking closure for the bottom of said pocket formed so as to discharge ashes from said pocket whenever the closure is rocked, and means for rocking said closure.

4. In a furnace, the combination with an inclined fire supporting surface, of a pocket defined by the lower edge of said inclined fire supporting surface and the bridge wall of said furnace, a segmental closure and discharge member operating beneath the pocket for closing the pocket against a vertical discharge of ashes thereon for causing a discharge of ashes upon rocking said segmental closure, and ash discharge member, and means for rocking said last mentioned member.

5. In a furnace, the combination with an inclined fire supporting surface, of walls arranged to form a pocket at the lower end of said surface, a closure and ash discharge member operating beneath said pocket for closing said pocket against a vertical discharge of ashes but causing a discharge horizontally of ashes upon rocking said closure, and means for rocking said closure.

6. In a furnace, the combination with an inclined fire supporting surface, of walls defining a pocket at the lower end of said fire supporting surface, a rocking closure and ash discharge member arranged at the bottom of said pocket for normally preventing ashes from escaping from said pocket in a vertical direction but causing a lateral discharge of ashes from said pocket upon a rocking movement of the closure and ash discharge member, and means for rocking said closure and discharge member adapted to move said closure and discharge member until the same permits the free vertical discharge of ashes from said pocket.

7. In a furnace, the combination with an inclined fire supporting surface, of walls defining an ash pocket arranged at the bottom of said surface, a closure and ash discharge member curved at its periphery mounted at the bottom of said pocket and centrally thereof, so as to substantially close the pocket, said closure and ash discharge member being formed larger than the distance across said pocket, and means for rocking said closure and ash discharge member with an amplitude normally not greater than the excess of the closure and ash discharge member over the pocket, the rocking of said closure and ash discharge member causing a discharge of ashes from said pocket.

8. In a furnace, the combination with a fire supporting surface, of walls defining a pocket at the inner end of said fire supporting surface, said pocket being open at the top and bottom, a pivotally mounted segmental member arranged at the bottom of said pocket adapted to act as an ash discharge member, and also as a closure for the pocket, said closure being formed with recesses therein for causing the closure to remove ashes from said pocket when the closure is rocked, and means to rock said closure so as to discharge ashes from said pocket substantially horizontally but maintain closed the lower end of the pocket against a vertical discharge therefrom.

9. In a furnace, the combination with a fire supporting surface, of walls defining a pocket at the inner end of said fire supporting surface arranged to receive ashes from said surface, a pivotally mounted closure positioned in the bottom of said pocket and formed with ash engaging means for causing the discharge of ashes from the pocket upon oscillation, and means for oscillating the closure.

10. In a furnace, the combination with a fire supporting surface, of walls arranged to form a pocket at the inner end of the fire supporting surface, said pocket being open at the top and bottom, a pivotally mounted closure having its periphery disposed so as to prevent any discharge of ashes from said pocket in a downward direction, said periphery being formed with a plurality of means for engaging ashes in said pocket and discharging the same laterally therefrom when said closure is rocked, and means for rocking the closure.

11. In a furnace, the combination with an inclined fire supporting surface, of walls defining a pocket at the lower end of said surface for receiving ashes therefrom, a segmental closure having an arc-shaped periphery pivotally mounted so as to move transversely of said pocket for discharging ashes from said pocket in a substantially horizontal direction when rocked, and means for rocking said closure transversely of said pocket.

12. In a furnace, the combination with a fire supporting surface, of walls arranged at the inner end of the fire supporting surface defining an ash receiving pocket formed with diverging sides, said pocket being larger at the bottom than at the top, a closure, and ash discharge member for the bottom of said pocket adapted at all times to contain ashes within the pocket and to discharge horizontally a portion of the ashes from the bottom of the pocket when the closure and ash discharge member is rocked, and means for rocking said closure and ash discharge member.

13. In a furnace, the combination with a fire supporting surface, of walls defining an ash receiving pocket having sides diverging downwardly, a closure and ash discharge member for the pocket adapted at all times to maintain ashes within the pocket, and means for rocking the closure and ash discharge member for discharging a portion of the ashes from the bottom of said pocket.

14. In a furnace, the combination with a fire supporting surface, of walls defining an ash receiving pocket having sides diverging downwardly, a closure for the bottom of said pocket so proportioned and constructed relative to the pocket that the ash in the pocket is prevented from discharging in a vertical direction from said pocket, but is discharged from one side of the pocket upon a rocking movement of the closure, and means for rocking said closure.

15. In a furnace, the combination with a fire supporting surface and a bridge wall, of a pendant wall having the upper edge thereof arranged adjacent the inner edge of said fire supporting surface, said pendant wall and said bridge wall defining a pocket with downwardly diverging sides, a rocking closure for the lower end of said pocket formed so as to discharge matter from said pocket when rocked, and means for rocking said closure.

In testimony whereof I affix my signature in presence of two witnesses.

WILLIAM McCLAVE.

Witnesses:
 CHAS. F. VOSBURG,
 WILLIS G. JONES.